(12) United States Patent
Tadmori

(10) Patent No.: US 12,115,033 B2
(45) Date of Patent: Oct. 15, 2024

(54) INTERDENTAL CLEANING SHEET AND METHOD OF USING THE SAME

(71) Applicant: Alaa M. Tadmori, Herndon, VA (US)

(72) Inventor: Alaa M. Tadmori, Herndon, VA (US)

(*) Notice: Subject to any disclaimer, the term of this patent is extended or adjusted under 35 U.S.C. 154(b) by 0 days.

(21) Appl. No.: 18/464,445

(22) Filed: Sep. 11, 2023

(65) Prior Publication Data

US 2024/0058108 A1    Feb. 22, 2024

Related U.S. Application Data

(62) Division of application No. 18/175,892, filed on Feb. 28, 2023, now abandoned.

(60) Provisional application No. 63/398,283, filed on Aug. 16, 2022.

(51) Int. Cl.
*A61C 15/00* (2006.01)
*A46B 9/02* (2006.01)
*A61C 15/04* (2006.01)

(52) U.S. Cl.
CPC ............ *A61C 15/041* (2013.01); *A46B 9/028* (2013.01); *A61C 15/046* (2013.01); *A46B 2200/108* (2013.01)

(58) Field of Classification Search
CPC ........... A61C 5/04; A61C 15/00; A61C 15/04; A61C 15/041

USPC ......................................................... 433/142
See application file for complete search history.

(56) References Cited

U.S. PATENT DOCUMENTS

| | | | | |
|---|---|---|---|---|
| 2,762,501 | A * | 9/1956 | Cameron | A61C 15/02 206/104 |
| 3,590,814 | A * | 7/1971 | Bennett | A61C 15/02 601/139 |
| 4,265,258 | A | 5/1981 | Eaton, II | |
| 5,063,948 | A | 11/1991 | Lloyd | |
| 5,609,170 | A * | 3/1997 | Roth | A61C 15/00 433/80 |
| 6,607,000 | B2 | 8/2003 | Marwah et al. | |

* cited by examiner

*Primary Examiner* — Rachel R Steitz
(74) *Attorney, Agent, or Firm* — Jerome Drabiak; Edison Law Group

(57) ABSTRACT

An interdental cleaning device embodying a micro-textured floss sheet having a leading edge for flossing laterally and less avulsively in a downward direction. The body of the floss sheet has an elongated cross-section where the cross-sectional height is at least ten to fifty or more times the cross-sectional width. The floss sheet is composed of material that does not buckle under compression when urged between two adjacent teeth and still has sufficient flexible for the floss sheet to bend along the interproximal/interdental tooth surfaces.

7 Claims, 5 Drawing Sheets

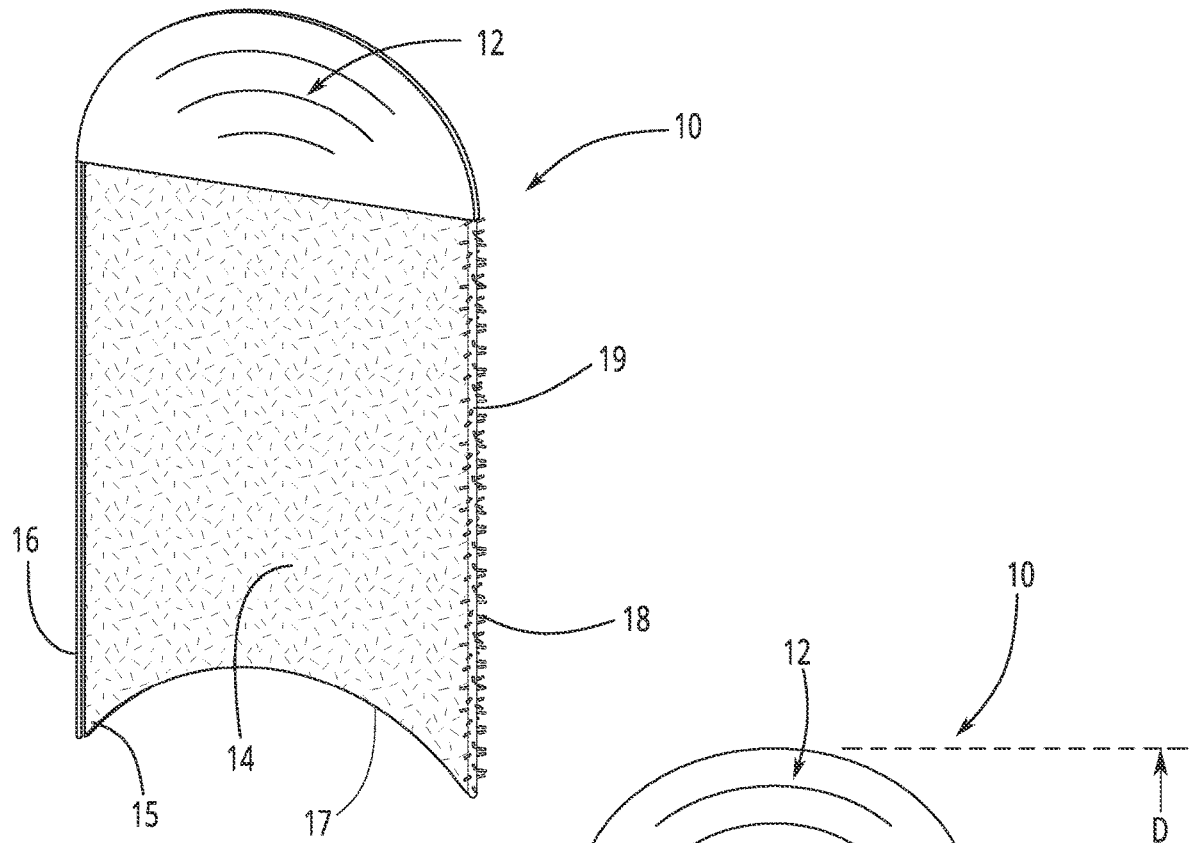
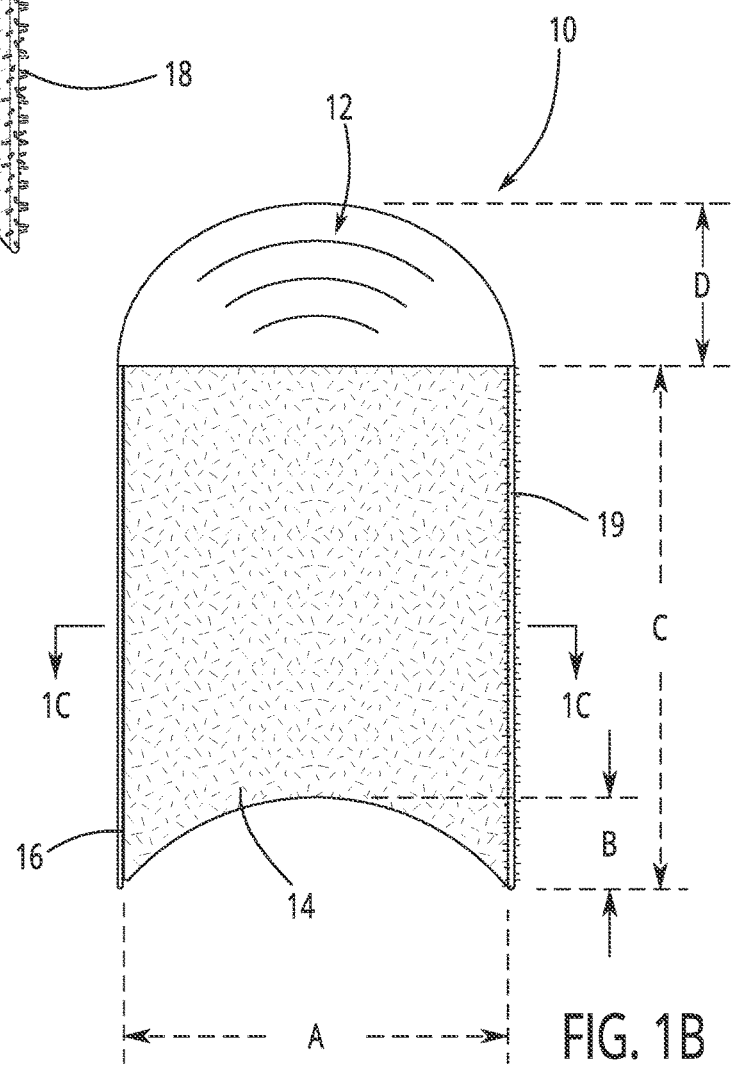
FIG. 1A
FIG. 1B

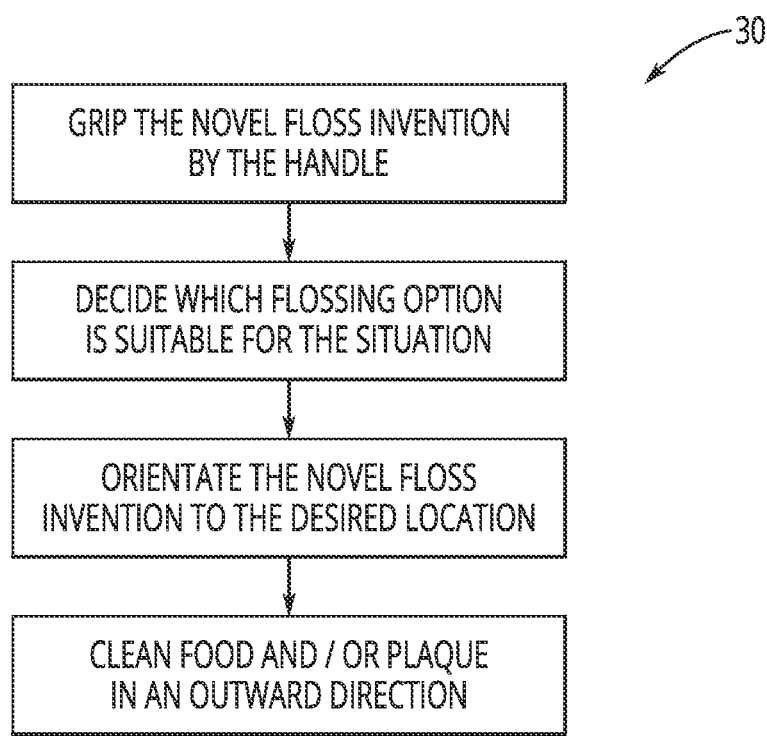
FIG. 5
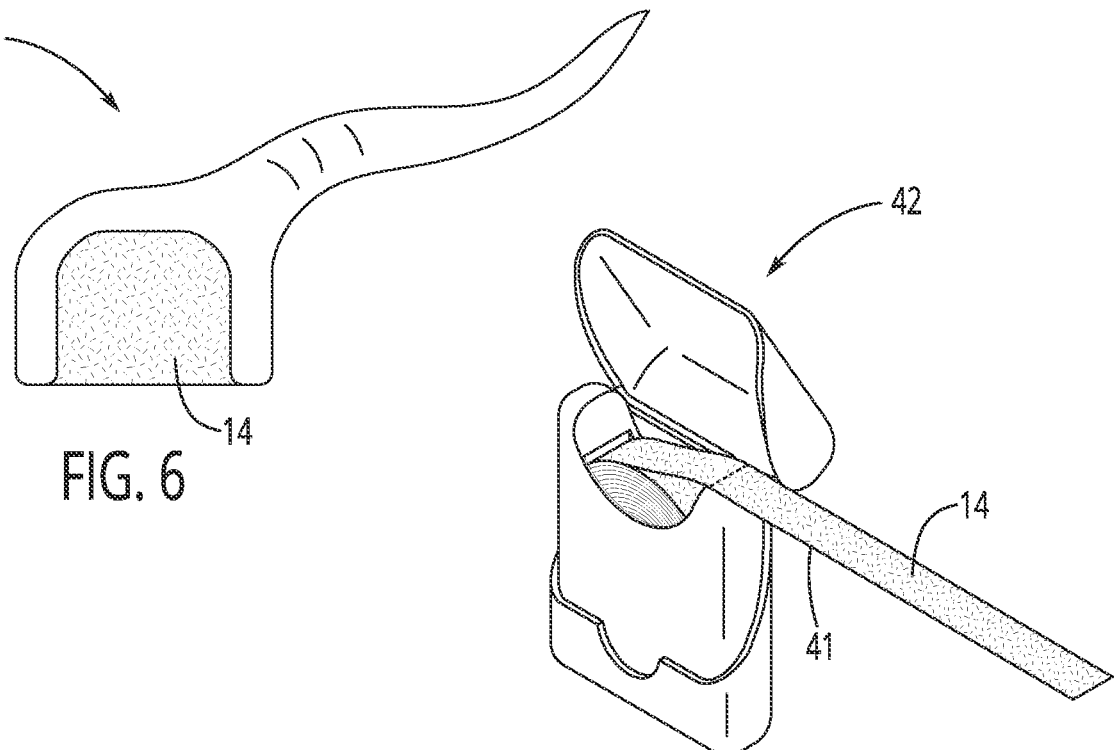
FIG. 6
FIG. 7

INTERDENTAL CLEANING SHEET AND METHOD OF USING THE SAME

CROSS-REFERENCE TO RELATED APPLICATION

This application claims the benefit of priority of U.S. provisional application No. 63/398,283 filed Aug. 16, 2022 the contents of which are herein incorporated by reference.

This application claims the benefit of priority of U.S. non-provisional application Ser. No. 18/175,892 filed Feb. 28, 2023, as a Divisional thereof, the contents of which are herein incorporated by reference.

BACKGROUND OF THE INVENTION

The present invention relates to dental cleaning devices and methods and more particularly, to an interdental cleaning sheet that may be mounted or held taut so that a user may floss in a manner that improves upon the prior art.

"Traditional floss"—e.g., thread, filament, or cord tensioned between two hands for interdental cleaning—tends to induce users to use it incorrectly, where they push the food and plaque downwards onto the gums. In other words, traditional floss tends to cause gum pain and bleeding (because of the pressure users need to apply on the tensioned floss to force it between the teeth) and doesn't completely clean the food/plaque unless it is used correctly which is challenging for most people.

Moreover, when confronted with interdental surfaces of adjacent teeth that are abutting, the force by which a user must urge the floss through the abutment can not only be strenuous, but it can result in a forceful "avulsive" release into the interdental region upon clearing the abutment. This avulsive release can cause severe, cutting damage to the gums that they come slicing down on, especially considering it has been observed that people have used traditional dental floss to slice cake.

A need exists for a floss sheet having a cross section, a stiffness, and an elasticity for enabling interdental cleaning without buckling (e.g., plate buckling).

SUMMARY OF THE INVENTION

The present invention includes a thin, micro-textured floss sheet that facilitates interdental cleaning away food, bacteria, and plaque in a less avulsive manner, due to its resistance to plate buckling, thereby preventing gum pain, bleeding, and contamination.

The floss sheet may be made from a floss sheet material that provides sufficient strength, specifically a (modulus of) elasticity, that under buckling forces induced by urging the floss sheet between two abutting interdental surfaces, does not buckle or otherwise fail, yet the (modulus of) elasticity affords the interdental cleaning flexibility so as to conform and flex around the interproximal/interdental tooth surfaces under such urging.

The high buckling-resistance of the floss sheet material is present at a thickness of approximately 0.07 millimeters; in other words, even at the smallest area moment of inertia of its slender cross section resists buckling. In certain embodiments, the floss sheet has a cross-sectional height of at least 0.75 centimeters, thereby defining an elongated, slender cross section through the length of its body. Due to its modulus of elasticity and its dimensionality, the floss sheet does not buckle under compression when urged between two adjacent teeth and still has sufficient flexible for the floss sheet to bend along the interproximal/interdental tooth surfaces in which it is so urged. The elongated slender cross-section and structural properties enables users to floss in a 'sawing', back and forth motion along or adjacent the occlusal surfaces to gain access to the interdental region, The floss sheet material has the integrity to maintain a 0.07-millimeter-thick edge that has a cross sectional height of at least 1.5 centimeters.

The floss sheet material may be non-shred, waxed, and micro-textured, wherein micro-texture is where the floss sheet has some texture to it to allow it to clean (kind of scrub) between the teeth and not just slide between them.

The floss sheet of the present invention is dimensioned and adapted to gently slide between the teeth and cleans with less resistance than prior art floss.

The strength and slender edge of the floss sheet enables the floss sheet to laterally access the interdental regions. By lateral, it is understood to be substantially parallel with the direction associated with the bucco-lingual width of a tooth. This ability to access the interdental region substantially laterally, enables and/or facilitates less avulsive flossing.

In one embodiment, the floss sheet embodies two straight longitudinal edges that are interconnected a curved edge thereby defining two pointed protrusions at the intersection of edge types. Each pointed protrusion can act as a toothpick. The present invention has an easy to grip handle which makes it easy to hold and use the floss sheet.

The floss sheet may be defined by two opposing longitudinal edges that are interconnected by a curved edge wherein each intersection of the curved edge and a longitudinal edge forms a pointed protrusion, thereby enabling at least three modes of interdental cleaning.

The present invention embodies an interdental cleaning method that requires less force and less manual dexterity, which aids the millions of Americans who have trouble grasping and manipulating objects, like floss, with their two-hand's fingers in a coordinated manner involving precise movements, e.g., people with a history of stroke, fractured bone, or some other medical conditions that limit use of the fingers/hands.

In one aspect of the present invention, an interdental cleaning device includes a floss sheet having an elongated cross section wherein a cross-sectional height thereof is at least ten to fifty times an associated cross-sectional width through substantially an entirety of a longitudinal length of the floss sheet.

In another aspect of the present invention, the floss sheet is micro-textured and has a cross-sectional width that is approximately 0.07 millimeters.

In yet another aspect of the present invention, the interdental cleaning device wherein the floss sheet defined by two opposing longitudinal edges that are interconnected by a curved edge, wherein each intersection of one longitudinal edge and the curved edge defines a pointed protrusion, wherein the curved edge is concave; further comprising gripping surface opposite the curved edge; a plurality of bristles along one of the two opposing longitudinal edges, wherein the plurality of bristles occupies more than half of a length of said one longitudinal edge; and two spaced apart times between which the floss tautly extends.

In another aspect of the present invention, the interdental cleaning device includes wherein the longitudinal length is at least ten times the cross-section height, and wherein the floss sheet is in a rolled configuration and operatively associated with a floss dispenser.

Another aspect of the present invention includes a method of flossing with the floss sheet, the method including urging a leading edge of the floss sheet laterally into an interdental region.

In yet another aspect of the present invention, a method for providing three modes of interdental cleaning through a one device, the method including the following: gripping a floss sheet defined by two opposing longitudinal edges that are interconnected by a curved edge, wherein each intersection of one longitudinal edge and the curved edge defines a pointed protrusion, and wherein the other longitudinal edge has a plurality of bristles; firstly sliding one of the pointed protrusions between two teeth in a lateral facial direction; secondly sliding the one longitudinal edge between two teeth in a lateral facial direction; and thirdly sliding the other longitudinal edge between two teeth in a lateral facial direction.

In another aspect of the present invention An interdental cleaning sheet having a slender cross section and sufficient modulus of elasticity to resist column buckling when the interdental cleaning sheet is urged between two abutting teeth, wherein a cross-sectional height of the interdental cleaning sheet is at least ten times an associated cross-sectional width through substantially an entirety of a longitudinal length of the interdental cleaning sheet, wherein an outer surface of the interdental cleaning sheet is micro-textured, wherein the cross-sectional width is approximately 0.07 millimeters, wherein the of interdental cleaning sheet is defined by two opposing longitudinal edges that are interconnected by a curved edge, wherein each intersection of one longitudinal edge and the curved edge defines a pointed protrusion, and wherein the curved edge is concave.

These and other features, aspects and advantages of the present invention will become better understood with reference to the following drawings, description, and claims.

BRIEF DESCRIPTION OF THE DRAWINGS

FIG. 1A is a front perspective view of an exemplary embodiment of the present invention.

FIG. 1B is a front elevation view of the exemplary embodiment of FIG. 1A, illustrating dimensionality thereof: CA' may be between 1.0 and 2.0 centimeters (cm); CB' may be between 0.2 and 0.4 cm; CC' may be between 1.5 and 2.5 cm; and D' may be between 0.5 and 0.9 cm. From dimensions 'A' and CB' the range of radius of curvatures of curvature 17 may be determined.

FIG. 5 is a flowchart 30 of an exemplary embodiment of the present invention.

FIG. 6 is a side elevation view of another exemplary embodiment of the present invention.

FIG. 7 is a perspective view of yet another exemplary embodiment of the present invention.

DETAILED DESCRIPTION OF THE INVENTION

Figure 1C:
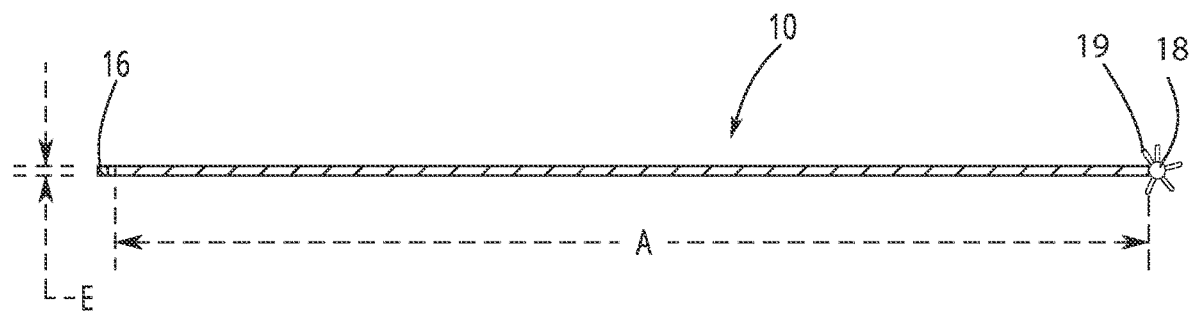
FIG. 1C is a section view of the exemplary embodiment of FIG. 1A, take along line 1C-1C of FIG. 1B, illustrating a cross-sectional thickness 'E' of between 0.05 and 0.09 millimeters and a cross-sectional height (unsupported length in the context of some critical buckling force determinations) CA' between 0.5 and 0.9 cm.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an interdental cleaning device embodying a micro-textured floss sheet having a leading edge for flossing laterally and downwardly. The body of the floss sheet has an elongated cross-section where the cross-sectional height is at least ten to fifty or more times the cross-sectional width. The floss sheet is composed of material that does not buckle under compression when urged between two adjacent teeth and still has sufficient flexible/elasticity for the floss sheet to bend along the interproximal/interdental tooth surfaces.

One embodiment of the floss sheet has two longitudinal edges interconnected by a concave-curved edge that defines a toothpick protrusion at each intersection of a longitudinal edge and the concave-curved edge. Opposite the concaved-curved edge may be a gripping surface. Along one of the longitudinal edges may be a plurality of bristles protruding therefrom.

A plate (here the floss sheet) is a 3-dimensional structure defined as having a width (herein cross-sectional height) of comparable size to its length (which here is the floss sheet's fixed ends), with a thickness (herein cross-sectional width) that is very small in comparison to its other two dimensions. Similar to columns, thin plates experience out-of-plane buckling deformations when subjected to critical loads; however, contrasted to column buckling, plates under buckling loads can continue to carry loads, called local buckling. This phenomenon is incredibly useful in numerous systems, as it allows systems to be engineered to provide greater loading capacities.

Referring to FIGS. 1-7, the present invention may include an interdental cleaning device 10 includes a micro-textured floss sheet 14 having structural properties to define an edge having a cross-sectional thickness of approximately 0.07 millimeters and a cross-sectional height (unsupported length in the context of some critical buckling force determinations) of more than 0.9 centimeters. The elongate cross-section enables maximum surface of the tooth circumference contacting the floss sheet 14.

The micro-textured material helps clean/scrub particulate, bacteria, and plague from between the teeth. Because of the structure and method of use, the material may be made of polytetrafluoroethylene (PTFE) or from other materials that when used as disclosed herein are not stressed beyond the elastic material range, given its slender cross section.

Furthermore, the stiffness of the floss sheet 14 enables user to access the interdental region through the upper surface (adjacent to the occlusal surfaces) of two abutting teeth through a sawing motion. Unlike traditional floss, the floss sheet's height (e.g., its vertical distance when being used in this top-down mode) engages the abutting surfaces of the teeth for this entire lengths, thus preventing or minimizing the avulsive snapping of traditional floss since the leading edge of the floss sheet 14 is closer to the gums by the time the last of the floss sheet's vertical height has cleared the abutment. With traditional floss, with its millimeter vertical height, there is no slow, long engagement and thus the snapping effect.

Figure 2:
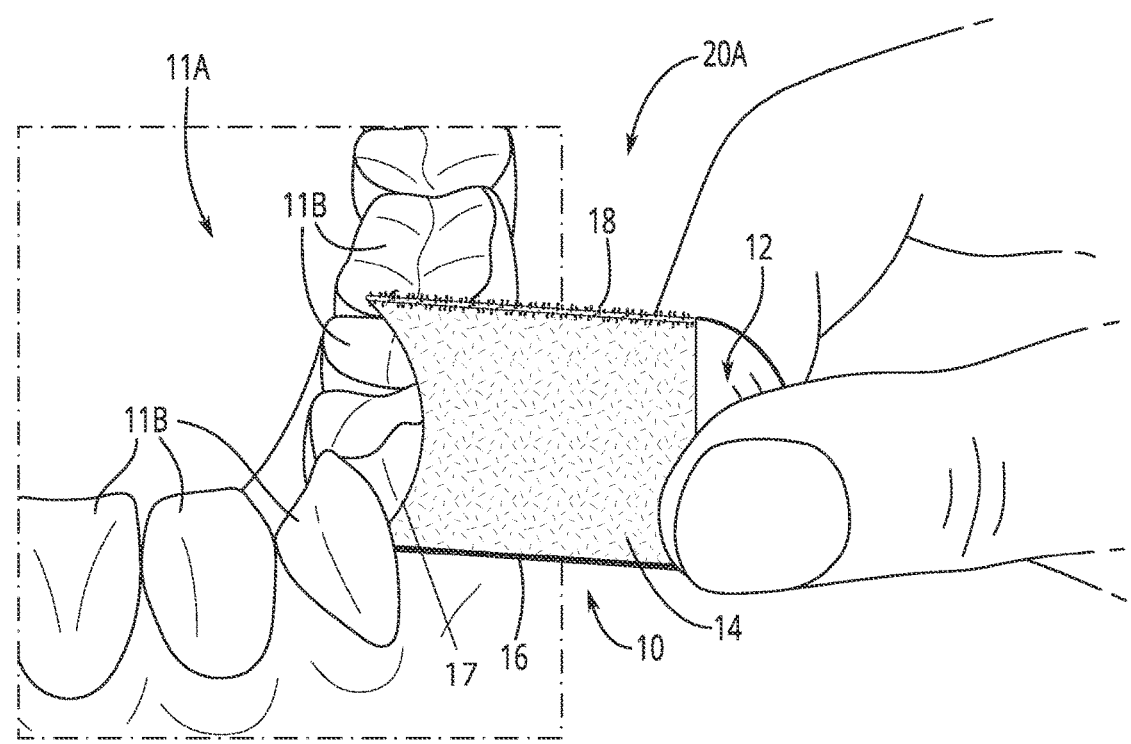
FIG. 2 is a detailed perspective view of an exemplary embodiment of the present invention, shown in use illustrating the lateral entry mode of interdental cleaning or flossing with one of the embodiments of the present invention. Also illustrated is how curvature 17, when inserted as the leading edge at or adjacent the gum line, undermines debris and bacteria so that as the curvature 17 moves forward, the debris and bacteria ride upward along the curvature 17.
Figure 3:
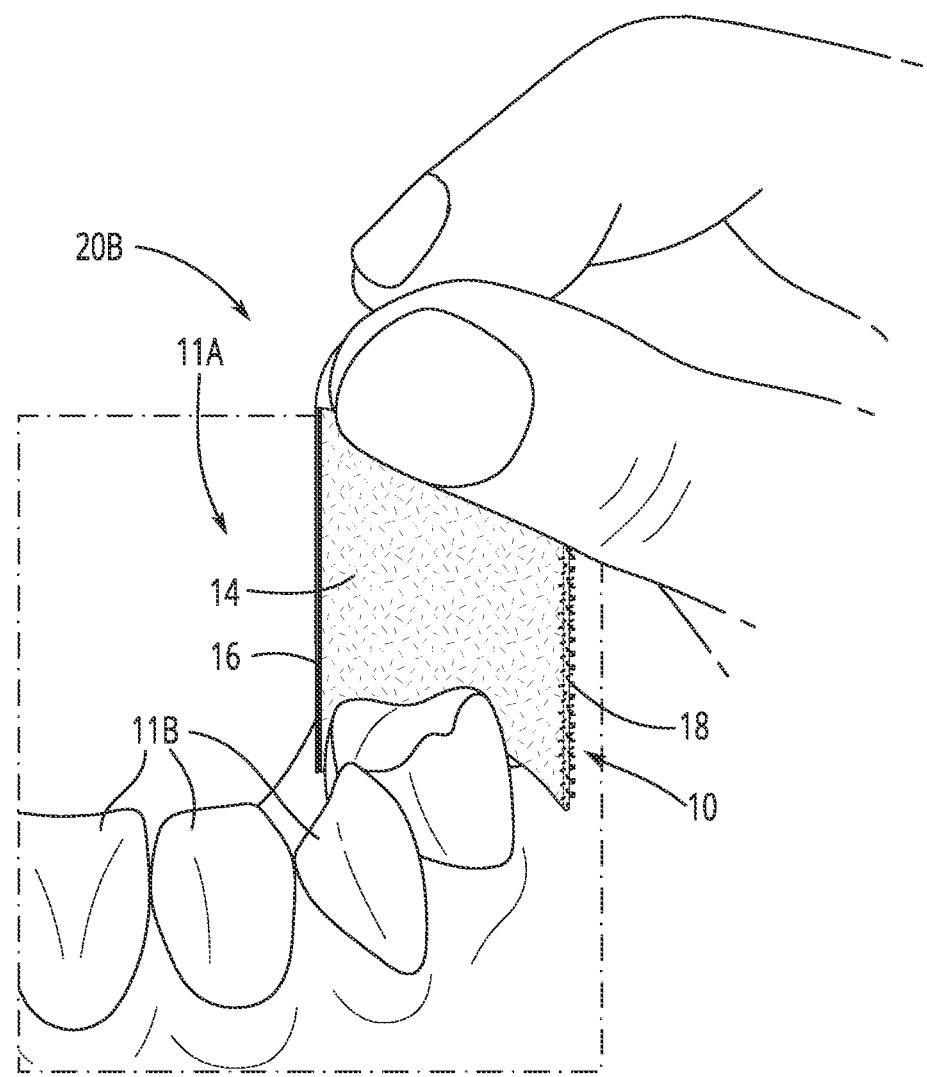
FIG. 3 is a detailed perspective view of an exemplary embodiment of the present invention, shown in use illustrating the sheet-first flossing mode.
Figure 4:
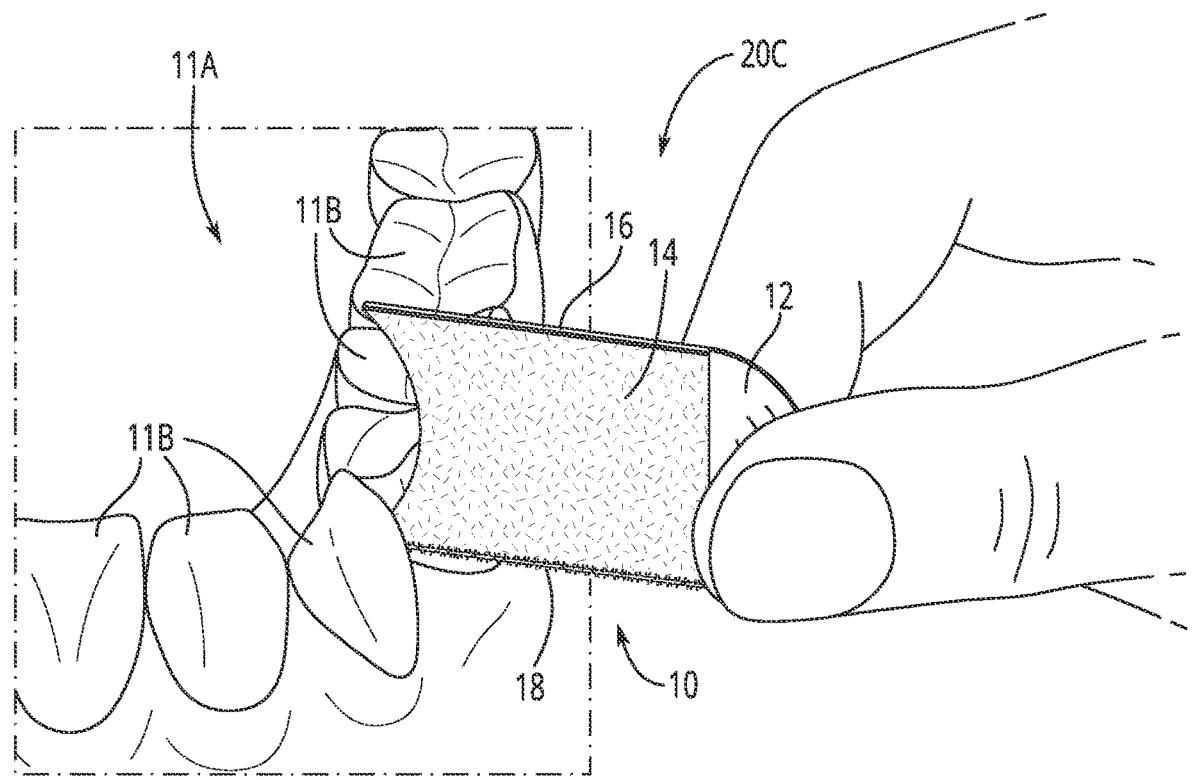
FIG. 4 is a detailed perspective view of an exemplary embodiment of the present invention, shown in use illustrating the bristle-first flossing mode.

Referring to FIGS. 2-4, one embodiment of the present invention may be adapted to provide two straight longitudinal edges 16 and 18 spaced apart and interconnected along one end by a curved edge 17. The intersection of each longitudinal edge and the curved edge defines a pointed protrusion 15. The floss sheet 14 has a combination stiffness and elasticity that prevents buckling, especially with its slender plate form, and failure when the interdental cleaning device 10 is used as disclosed herein.

The floss sheet 14 may have a quadrilateral shape with two straight longitudinal edges with a straight edge interconnecting the longitudinal edges on one end opposite the curved edge 17. The curved edge 17 may be concave to define the pointed protrusions. Along the first edge may be a gripping surface/handle 12 that a user may pinch to manipulate the interdental cleaning device 10. Along a second longitudinal edge 18 may be bristles 19 that protrude therefrom for providing an enhanced cleaning and scraping action to the interproximal/interdental tooth surfaces to remove plaque and bacteria.

The interdental cleaning device 10 may be used in one of three modes because of the novel floss sheet 14. The first mode 20A, the toothpick-first option, is shown in FIG. 2, where the user slides one of the toothpick protrusions 15 between two teeth 11B of an individual 11A needing interdental cleaning.

The second mode 20B, the unadorned longitudinal-edge option, is shown in FIG. 3, wherein the user slides the unadorned longitudinal edge 16 between two teeth 11B.

The third mode 20B, the bristle longitudinal-edge option, is shown in FIG. 4, wherein the user slides the bristled longitudinal edge 18 between two teeth 11B.

In each of these modes the user orients the floss sheet 14 in the desired location, slides it between two adjacent teeth, and cleans food and/or plaque in an lateral direction.

Referring the FIGS. 6 and 7, the present invention may embody the floss sheet 14 in other forms, including a "floss-stick" applicator 40 embodiment wherein the continuous floss sheet 14 replaces the thread/cord floss between two tines. Alternatively, the floss sheet 14 may come in roll form 41 that can be delivered through a sheet roller dispenser 42.

In use, the floss sheet is positioned in between adjacent teeth of the user to clean the interproximal/interdental tooth surfaces in a lateral direction. As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. An interdental cleaning sheet having:
a spaced-apart pair of longer edges;
a spaced-apart pair of shorter edges; and
a stiffness effective to resist buckling when the interdental cleaning sheet is urged between adjacent teeth,
wherein the shorter edges are disposed transverse to the longer edges, wherein one of the longer edges has a cylindrical exterior surface along a length thereof and a plurality of bristles extending radially outward from the cylindrical surface.

2. The interdental cleaning sheet of claim 1, wherein the longer edges have a height value, wherein the shorter edges have a width value, and wherein the height value ranges from about ten times to about fifty times the width value.

3. The interdental cleaning sheet of claim 1, wherein one of the shorter edges is curved inwardly toward the other one of the shorter edges, wherein an end portion of the curved shorter edge is fixed to an end portion of said one of the longer edges and extends away from the other one of the shorter edges to form a protrusion adapted and configured for lateral insertion between adjacent teeth into an interdental region.

4. An interdental cleaning device comprising:
the interdental cleaning sheet of claim 3; and
a handle affixed to said other one of the shorter edges.

5. The interdental cleaning sheet of claim 1, wherein the sheet also has a cross-sectional thickness of between 0.05 and 0.09 millimeters.

6. An interdental cleaning device comprising:
the interdental cleaning sheet of claim 1; and
a handle affixed to one of the shorter edges.

7. An interdental cleaning sheet having:
a spaced-apart pair of longer edges;
a spaced-apart pair of shorter edges;
a cross-sectional thickness of between 0.05 and 0.09 millimeters; and a stiffness effective to resist buckling when the interdental cleaning sheet is urged between adjacent teeth, wherein the shorter edges are disposed transverse to the longer edges, wherein one of the longer edges has a cylindrical exterior surface along a length thereof and a plurality of bristles extending radially outward from the cylindrical surface, wherein one of the shorter edges is curved inwardly toward the other one of the shorter edges, and wherein an end portion of the curved shorter edge is fixed to an end portion of said one of the longer edges and extends away from the other one of the shorter edges to form a protrusion dimensioned, adapted, and configured for lateral insertion between adjacent teeth into an interdental region.

* * * * *